Sept. 30, 1969

M. HETZEL 3,470,401

DEVICE FOR LIMITING THE AMPLITUDE OF OSCILLATION OF A MECHANICAL RESONATOR FOR ELECTROMECHANICAL TIME PIECE

Filed May 26, 1967

3,470,401
DEVICE FOR LIMITING THE AMPLITUDE OF OSCILLATION OF A MECHANICAL RESONATOR FOR ELECTROMECHANICAL TIME PIECE

Max Hetzel, Bienne, Switzerland, assignor to Centre Electronique Horloger SA, Neuchatel, Switzerland, a Swiss corporation Filed May 26, 1967, Ser. No. 641,564
Claims priority, application Switzerland, May 27, 1966, 7,714/66
Int. Cl. H03b 5/30
U.S. Cl. 310—25 7 Claims

ABSTRACT OF THE DISCLOSURE

A device for limiting the amplitude of oscillation perpendicular to the normal oscillatory plane of a mechanical resonator for electro-mechanical time pieces, comprising yieldable stop members placed above and below the resonator but near it, these stop members being driven by the resonator parallel to its normal oscillatory plane when said resonator contacts said stop members as a result of shock resulting from impact.

This invention relates to means for attenuating the effects of parasitic vibration frequencies arising when a time measuring device employing a resonator undergoes shock, such as when it is dropped or is hit.

In time pieces employing a mechanical resonator as frequency standard or driving member or to fulfill these two functions simultaneously it is important that in case of impact on the case of the time piece, this impact does not communicate to the resonator an oscillation having an amplitude in excess of a certain critical value or there may occur one of the following results: unwanted disconnection of the driving pawl from the ratchet wheel, disturbance in the oscillation frequency and consequent error in time, impact of the resonator against a neighboring part, etc.

This is the case in particular of the oscillations perpendicular to the normal oscillatory plane of the resonator. In order to limit the amplitude of the oscillation, there are placed on either side of the resonators stops defining with precision the maximum amplitude of permissible perpendicular oscillation. However these fixed stops which are rigid or slightly compressible cause during their contact with the resonator, a braking by friction on the resonator, which disturbs the good functioning of the watch.

The device according to the invention permits to diminish to a very great extent the effect of frictional braking when the resonator contacts the stop, the only braking subsisting being due to the energy necessary to drive the stop member.

The accompanying drawing represents by way of example two embodiments of the invention.

FIGURE 1 shows a partial vertical cross-section through an electro-mechanical time piece comprising a mechanical resonator for example a tuning fork or a torsion oscillator.

Figure 1:
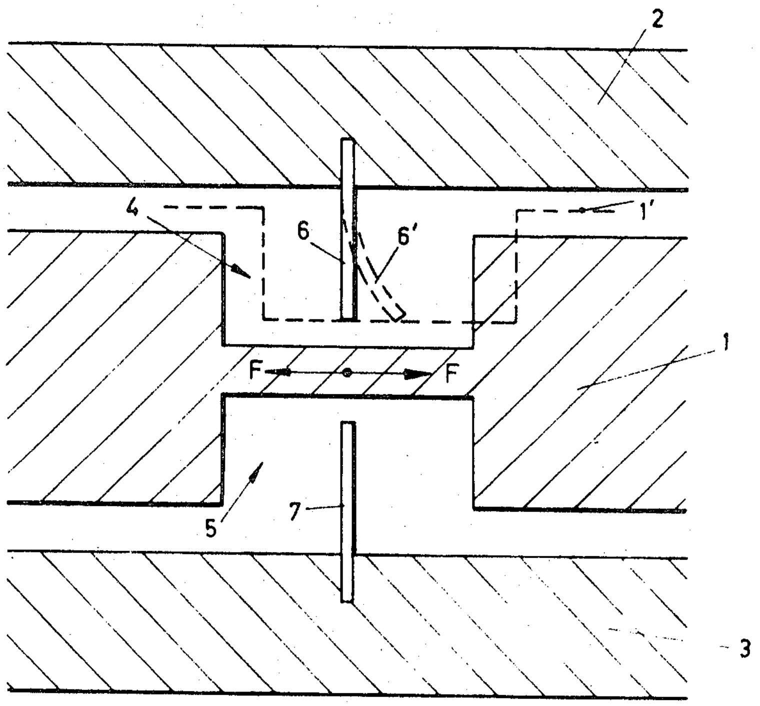
FIGURE 1 shows cross-sectionally a first embodiment.

Resonator 1 oscillates normally in a plane perpendicular to the drawing in the direction of arrows F between a plate 3 and a bridge 2. On the two opposed surfaces of the resonator are made housings 4 and 5, preferably cylindrical, with a horizontal flat bottom. In bridge 2, in front of housing 4, is encased a flexible rod 6, the free end of which is engaged in housing 4 at a small distance from the bottom of this housing. An identical rod 7 is encased in plate 3 and engages in housing 5 of the resonator.

Housings 4 and 5 will be preferably made at the free ends thereof, for example at the extremities of the branches of a tuning fork type resonator, extremities to which are secured the oscillating masses bearing the magnets and elements of the maintenance transducers.

Flexible rods 6 and 7 form stops limiting the amplitude of transversal oscillation perpendicular to the normal oscillatory plan of the resonator and occurring during external impact on the time piece. When the resonator comes into contact for example with the rod of stop 6 the latter has a tendency by its rubbing on the bottom of housing 4 to brake the resonator during its normal oscillation along arrows F disturbing then the accuracy of the watch. Rod 6 being flexible, it will however be flexurally driven by the resonator, reducing appreciably the damping of the resonator by rubbing of rod 6. Resonator 1 when it has been subjected to a vertical shock is shown by the dotted line 1′ in a horizontal position also deviated from its rest position shown in full lines. Rod 6 bends to occupy position 6′ shown in dotted lines. During impact against rod 7, this rod will behave in the same way.

The material and the shape of rods 6 and 7 will be selected in such a way that they will simultaneously have a considerable resistance to buckling and a sufficient flexibility to be easily driven by friction and without slipping by the resonator, when the same enters into contact with one of them.

The flexibility of the rods can be increased without decreasing their resistance to buckling by slightly diminishing their cross-section near the point where they are encased.

This modification however has the drawback that in the case of a very violent impact the rods will bend too much thereby losing their amplitude limiting effect and can even break.

Figure 2:
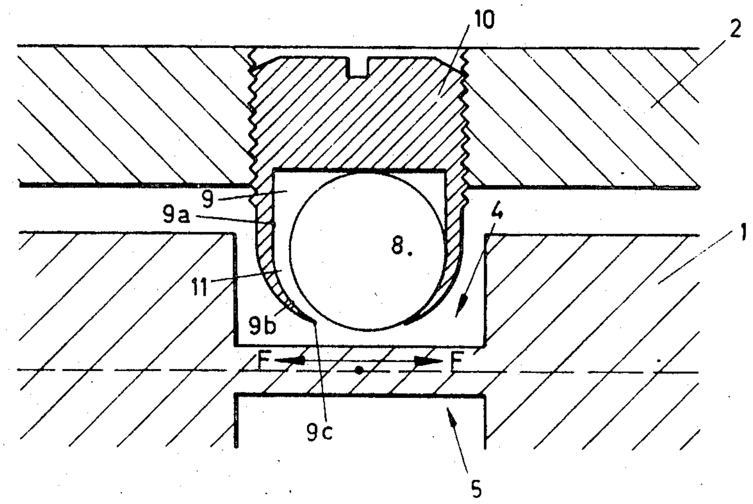
FIGURE 2 shows cross-sectionally a second embodiment.

In FIGURE 2 is shown a second modification which does not have the above-mentioned disadvantage.

There is seen in this figure resonator 1, bridge 2 and plate 3 as well as housings 4 and 5 made in the resonator. The stop however is here constituted by a hardened tempered steel ball 8 placed in a housing 9 having a flat bottom and the cylindrical wall of which 9*a* incurves to partially surround the ball along a part 9*b* in the form of a spherical cap having a circular opening 9*c*, ball 8*a* overlapping slightly this opening. Housing 9 is made for example by milling in the body of a screw 10 embedded in bride 2. Part 9*b* of the housing is obtained by crushing the edges of the milling 9.

Play 11 is left between ball 8 and the walls of the housing permitting to the ball to roll on the bottom of the housing, this play must be sufficient to allow the ball to make in its housing an incursion at least equal to twice the amplitude of the resonator at the point where the resonator hits the ball 8 during a shock giving to the resonator an oscillation perpendicular to its normal oscillatory plane.

Supposing that ball 8 is in the position shown in the drawing, that is bears on the right against the wall of housing 9. When the bottom of housing 4 of the resonator hits ball 8 this vertical movement is always accompanied by an oscillatory movement along arrows F. At the instant of contact between the resonator and the ball 8, the resonator can either have an instantaneous movement to the left or to the right or still yet have an instantaneous zero velocity, the resonator arriving at the end of its horizontal incursion. In the case where the instantaneous movement is directed to the left, ball 8 will be immediately driven by the resonator rolling along the bottom of housing 4 and along the bottom of housing 9. The incursion of the ball in housing 9 being at least equal to twice the amplitude of the resonator at the point of contact, the ball will not slide on the bottom of the housing 4 but can at the most slide thereon when the resonator returns to the right in contact between ball 8 and the resonator is still established, which is not certain. This will be also true when contact between the resonator and the ball 8 establishes itself at the moment when the resonator reaches its right hand limit of horizontal oscillation.

This case naturally is the most preferable since the ball will never be retained by its housing and can roll theoretically indefinitely between the bottom of housing 9 and the bottom of housing 4.

If on the other hand the resonator contacts ball 8 when it moves to the right, the ball will slide first along the bottom of housing 4 up to the moment when the resonator arrives at the end of its incursion then it will begin to roll and will continue to roll without sliding if contact continues between the ball and the resonator.

An identical ball, not shown, is screwed in plate 3 at a distance from the bottom of housing 5 which is equal to the distance separating ball 8 from the bottom of housing 4.

The diameter of housings 4 and 5 will be naturally large enough so that the support of the ball will not hit against the walls of its housings. This diameter can nevertheless be selected to be such that when the normal oscillation of the resonator in the direction of arrows F exceed the amplitude of oscillation of the resonator during normal functioning, the walls of housing 4 and 5 will hit against the support of the balls, these also limiting the amplitude of oscillation of the resonator in case of impact exerting its action parallel to the plane of oscillation.

In case of a ball, there can also be used a cylinder, but the fabrication of the stop member would as a result be complicated.

The invention has been described with respect to two typical embodiments thereof but many modifications of it are possible. For example, in order to dampen more rapidly accidental transversal oscillation of the resonator, the ball can be mounted on a slightly compressible support capable of absorbing and damping the shocks received by it.

It is possible for example to place a mass of plastic material behind the mobile bottom of housing 9 of the screw 10 in a ring of plastic material.

What is claimed is:

1. Device for limiting the amplitude of oscillation perpendicular to the normal oscillation plane of a mechanical resonator for electromechanical time piece comprising stop members movable in the direction of said normal oscillation plane mounted above and below said resonator, said resonator having housings adpated to receive said stop members, said stop members being driven by said resonator parallel to the normal plane of oscillation thereof when said resonator comes into contact with said members.

2. Device according to claim 1, wherein said stop members consist each of at least one flexible rod perpendicular to said resonator and adapted to be secured to a fixed part of said time piece.

3. Device according to claim 1, wherein said stop members each comprise a ball maintained with play in said lodging, said ball being adapted for rolling in said housing when driven by said resonator.

4. Device according to claim 3, wherein the play of said ball in said housing in a direction of oscillation normal to said resonator is at least equal to twice the amplitude of the resonator at its contact point with said ball.

5. Device according to claim 3, wherein said ball engages in a hollow of the resonator.

6. Device according to claim 1, wherein said housings are treaded in a fixed part of said time piece.

7. Device according to claim 6, wherein said housing also limits excessive amplitudes in the plane of the resonator.

References Cited

UNITED STATES PATENTS

| | | | |
|---|---|---|---|
| 2,555,936 | 6/1951 | Rogers et al. | 310—25 XR |
| 2,860,290 | 11/1958 | Fettinger | 317—182 |
| 2,971,323 | 2/1961 | Hetzel | 331—156 XR |
| 2,971,104 | 2/1961 | Holt | 310—25 XR |
| 3,156,857 | 11/1964 | Herr et al. | 310—36 XR |
| 3,308,313 | 3/1967 | Favre | 310—36 |

FOREIGN PATENTS

| | | |
|---|---|---|
| 761,609 | 11/1956 | Great Britain. |

MILTON O. HIRSHFIELD, Primary Examiner

B. A. REYNOLDS, Assistant Examiner

U.S. Cl. X.R.

331—156; 58—23; 84—457